(12) United States Patent
Huelke et al.

(10) Patent No.: US 9,725,032 B2
(45) Date of Patent: Aug. 8, 2017

(54) INTEGRATED COAT HOOK AND LIGHT SOURCE ASSEMBLY

(71) Applicant: FORD GLOBAL TECHNOLOGIES, LLC, Dearborn, MI (US)

(72) Inventors: David Huelke, Milan, MI (US); Scott Holmes Dunham, Redford, MI (US); Guillermo Alanis, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 257 days.

(21) Appl. No.: 14/512,820

(22) Filed: Oct. 13, 2014

(65) Prior Publication Data

US 2016/0102851 A1 Apr. 14, 2016

(51) Int. Cl.
| | |
|---|---|
| *F21V 21/30* | (2006.01) |
| *B60Q 3/02* | (2006.01) |
| *F21V 23/06* | (2006.01) |
| *B60R 7/10* | (2006.01) |
| *B60Q 3/85* | (2017.01) |
| *B60Q 3/20* | (2017.01) |
| *B60Q 3/57* | (2017.01) |

(52) U.S. Cl.
CPC ............. *B60Q 3/0243* (2013.01); *B60Q 3/20* (2017.02); *B60Q 3/57* (2017.02); *B60Q 3/85* (2017.02); *B60R 7/10* (2013.01)

(58) Field of Classification Search
CPC ......... F21V 21/30; B60Q 3/0203; B60R 7/10; A47G 25/065
See application file for complete search history.

(56) References Cited

U.S. PATENT DOCUMENTS

| | | | | |
|---|---|---|---|---|
| 2,390,257 | A | * 12/1945 | Jahn ..................... | A47G 25/065 248/294.1 |
| 4,600,978 | A | * 7/1986 | Kimura ................. | B60Q 3/001 362/269 |
| 4,686,609 | A | 8/1987 | Dykstra et al. | |
| 5,366,127 | A | 11/1994 | Heinz | |
| 5,492,260 | A | 2/1996 | Rieden et al. | |
| 6,022,119 | A | * 2/2000 | Booty, Jr. .............. | F21V 27/00 362/419 |
| 6,095,469 | A | 8/2000 | Von Alman | |
| 6,663,067 | B2 | * 12/2003 | Gordon ................ | A47G 25/065 224/553 |
| 6,715,813 | B2 | 4/2004 | Thompson et al. | |

(Continued)

FOREIGN PATENT DOCUMENTS

| | | |
|---|---|---|
| CN | 203255008 U | 10/2013 |
| DE | 19955621 A1 | 5/2001 |

(Continued)

OTHER PUBLICATIONS

English Machine Translation of CN203255008.
English Machine Translation of DE19955621.
English Machine Translation of DE102008031011.

*Primary Examiner* — Elmito Breval
*Assistant Examiner* — Zachary J Snyder
(74) *Attorney, Agent, or Firm* — Vichit Chea; King & Schickli, PLLC

(57) ABSTRACT

An integrated coat hook and light source assembly includes a housing, a base pivotally carried on the housing, a coat hook carried on the base and a light source carried on the base.

12 Claims, 4 Drawing Sheets

(56) References Cited

U.S. PATENT DOCUMENTS

| | | | |
|---|---|---|---|
| 7,669,821 B2* | 3/2010 | Martin | B60R 7/043 |
| | | | 224/313 |
| 7,988,115 B2 | 8/2011 | Lee et al. | |
| 8,733,830 B2* | 5/2014 | Sanchez | B60N 2/4838 |
| | | | 297/188.03 |
| 2003/0121943 A1* | 7/2003 | Chou | B60R 7/084 |
| | | | 224/275 |
| 2004/0036304 A1* | 2/2004 | Thompson | B60N 3/023 |
| | | | 296/1.02 |
| 2004/0109324 A1* | 6/2004 | Tiesler | B60N 3/023 |
| | | | 362/488 |
| 2005/0157512 A1* | 7/2005 | Suzuki | B60Q 3/001 |
| | | | 362/488 |
| 2005/0195593 A1* | 9/2005 | Horn | A47G 1/02 |
| | | | 362/140 |
| 2005/0276056 A1* | 12/2005 | Tiesler | B60Q 3/0203 |
| | | | 362/490 |
| 2006/0261229 A1* | 11/2006 | Hirota | B60R 7/10 |
| | | | 248/304 |
| 2007/0177375 A1* | 8/2007 | Petzl | F21V 21/145 |
| | | | 362/157 |
| 2008/0239709 A1* | 10/2008 | Rapeanu | F21S 8/024 |
| | | | 362/147 |
| 2008/0259615 A1* | 10/2008 | Chien | F21S 4/28 |
| | | | 362/382 |
| 2009/0059606 A1* | 3/2009 | Chien | F21S 4/28 |
| | | | 362/394 |
| 2010/0108628 A1* | 5/2010 | Oh | A47F 11/10 |
| | | | 211/123 |
| 2011/0063827 A1* | 3/2011 | Cristoforo | F21V 21/0816 |
| | | | 362/191 |
| 2012/0200227 A1* | 8/2012 | Nasiatka | F21L 4/00 |
| | | | 315/159 |
| 2013/0083517 A1* | 4/2013 | Bratton | F21V 33/006 |
| | | | 362/191 |
| 2014/0034692 A1* | 2/2014 | Huelke | B60R 7/10 |
| | | | 224/313 |
| 2014/0332575 A1* | 11/2014 | Huelke | B60R 7/10 |
| | | | 224/553 |

FOREIGN PATENT DOCUMENTS

| | | |
|---|---|---|
| DE | 102008031011 A1 | 12/2009 |
| EP | 2305516 A1 | 4/2011 |

* cited by examiner

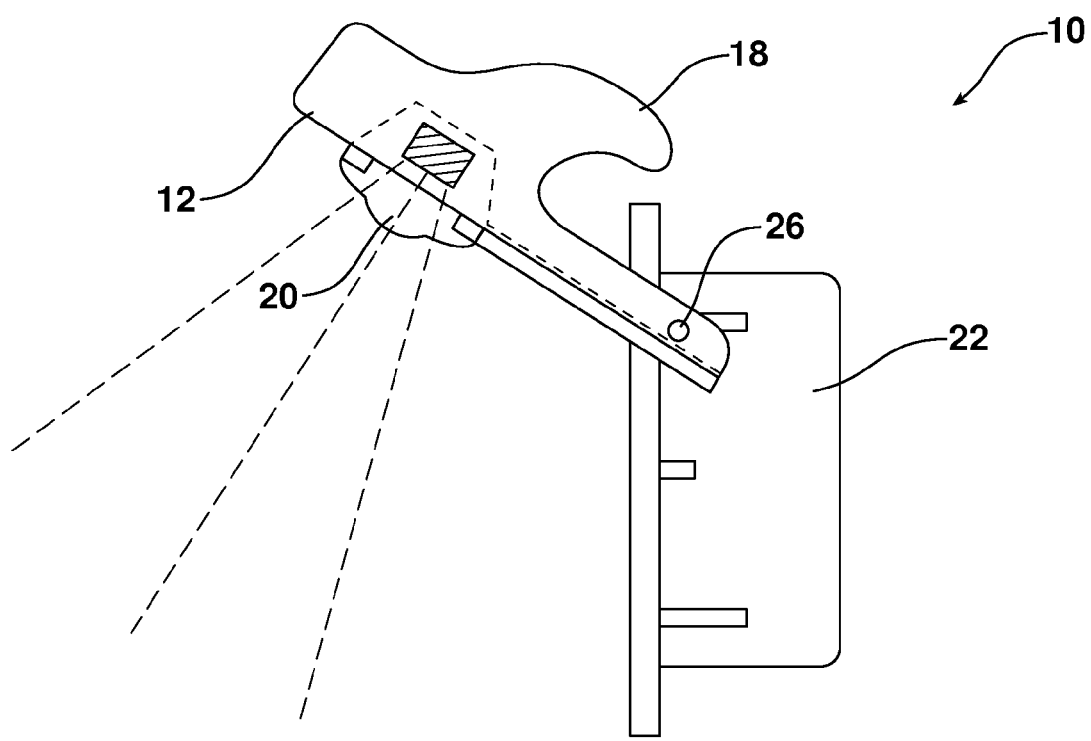
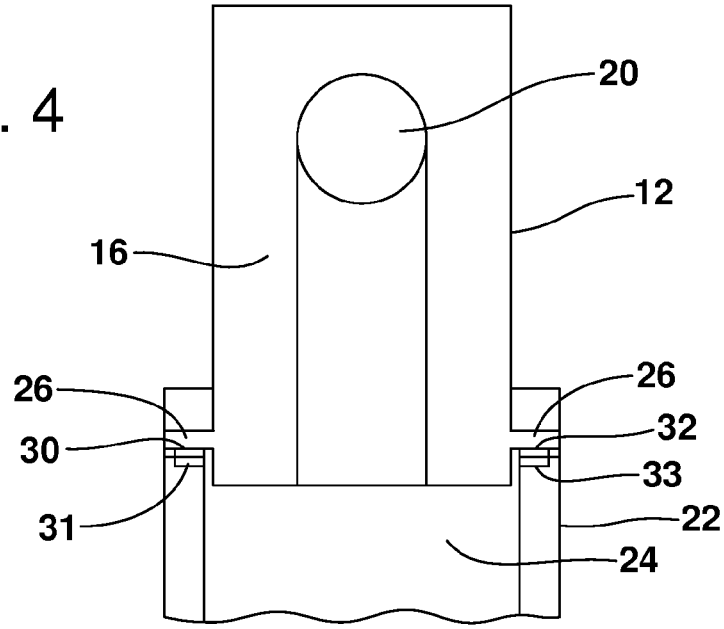

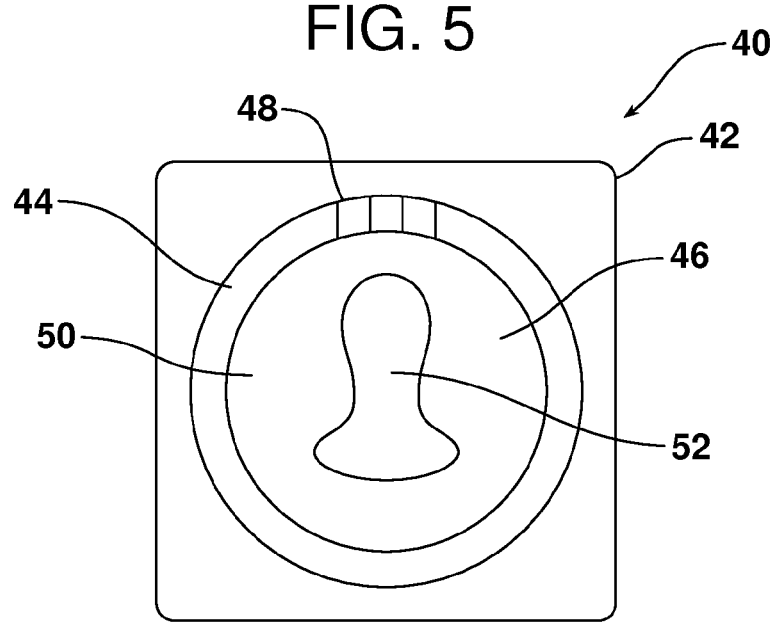
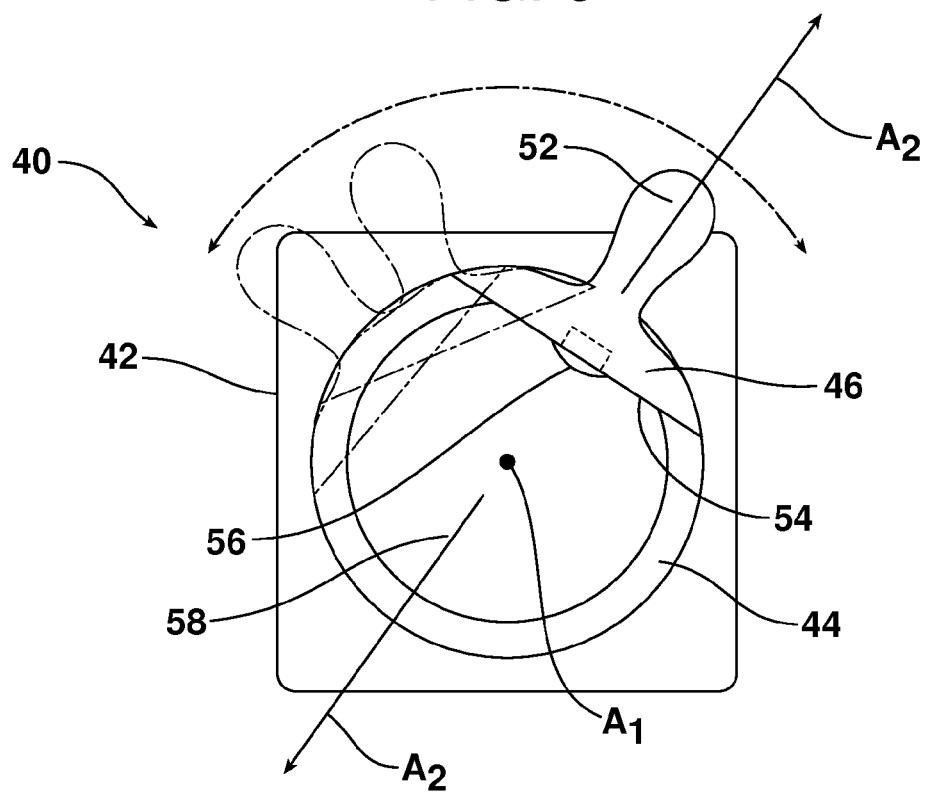

INTEGRATED COAT HOOK AND LIGHT SOURCE ASSEMBLY

TECHNICAL FIELD

This document relates generally to the field of motor vehicle interior accessories and, more particularly, to an integrated coat hook and light source assembly that may be mounted on the headliner inside the roof of a motor vehicle.

BACKGROUND

Many different components such as coat hooks and lamps are provided on a headliner. Sometimes the design of the headliner does not allow the necessary space for all of these components particularly where the lamps or lighting are supposed to be directed toward a particular target. In other situations the headliner surface suffers from a cluttered appearance when too many different components are mounted on the headliner.

This document relates to an integrated coat hook and light source assembly that reduces the clutter, provides an aesthetically pleasing appearance and in at least one embodiment allows for directional lighting that may be simply and easily manipulated by the user in order to light one or more desired target areas within the vehicle.

SUMMARY

In accordance with the purposes and benefits described herein, an integrated coat hook and light source assembly is provided. That assembly comprises a base having a first face and a second face, a coat hook carried on the first face and a light source carried on the second face.

More particularly the integrated coat hook and light source assembly may comprise a housing, a base pivotally carried on the housing, a coat hook carried on the base and a light source carried on the base. In one possible embodiment the base has a first face and a second face. The coat hook is carried on the first face and the light source is carried on the second face.

In one possible embodiment the housing includes a cavity having an opening. The base is pivotally displaceable between a first position wherein the cavity is closed by the base and the light source is hidden in the cavity and a second position wherein the cavity is open and the light source is directed away from the cavity to the interior of the vehicle. In one possible embodiment, the base is pivotally connected to the housing by first and second opposed hinge pins. The first hinge pin may carry a first electrical contact while the second hinge pin may carry a second electrical contact. Together these contacts provide a pathway to provide electrical power to the light source.

In yet another possible embodiment, the assembly includes a bezel mounted for rotation relative to the housing. The base is connected by means of a hinge to this bezel. The bezel rotates about a first axis $A_1$ and the base pivots about a second axis $A_2$ where the first axis is perpendicular to and offset from the second axis.

In the following description, there are shown and described several preferred embodiments of the integrated coat hook and light source assembly. As it should be realized, the assembly is capable of other, different embodiments and its several details are capable of modification in various, obvious aspects all without departing from the assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the integrated coat hook and light source assembly and together with the description serve to explain certain principles thereof. In the drawing:

FIG. 3 is a side elevational view illustrating the assembly in the same position as shown in FIG. 2.

FIG. 4 is a schematic illustration of the electrical contacts on the hinge pin of the base through which power is directed to the light source.

FIG. 5 is a front elevational view of another possible embodiment of the invention wherein the housing includes a bezel and the base is pivotally mounted by means of a hinge to the bezel.

FIG. 6 is a front elevational view of the second embodiment illustrated in FIG. 5 but with the base pivoted into an open position and showing how the bezel may be rotated to direct the light from the light source into the interior of the vehicle.

Reference will now be made in detail to the present preferred embodiments of the integrated coat hook and light source assembly, examples of which are illustrated in the accompanying drawing figures.

DETAILED DESCRIPTION

Figure 1:
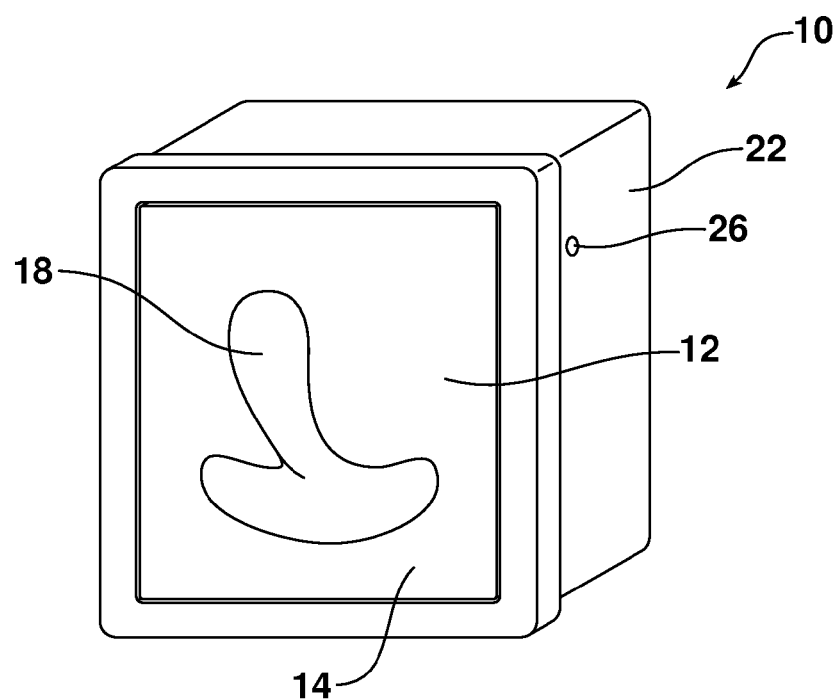
FIG. 1 is a perspective view of one possible embodiment of the integrated coat hook and light assembly with the base pivoted into the closed position and the light source hidden from view.
Figure 2:
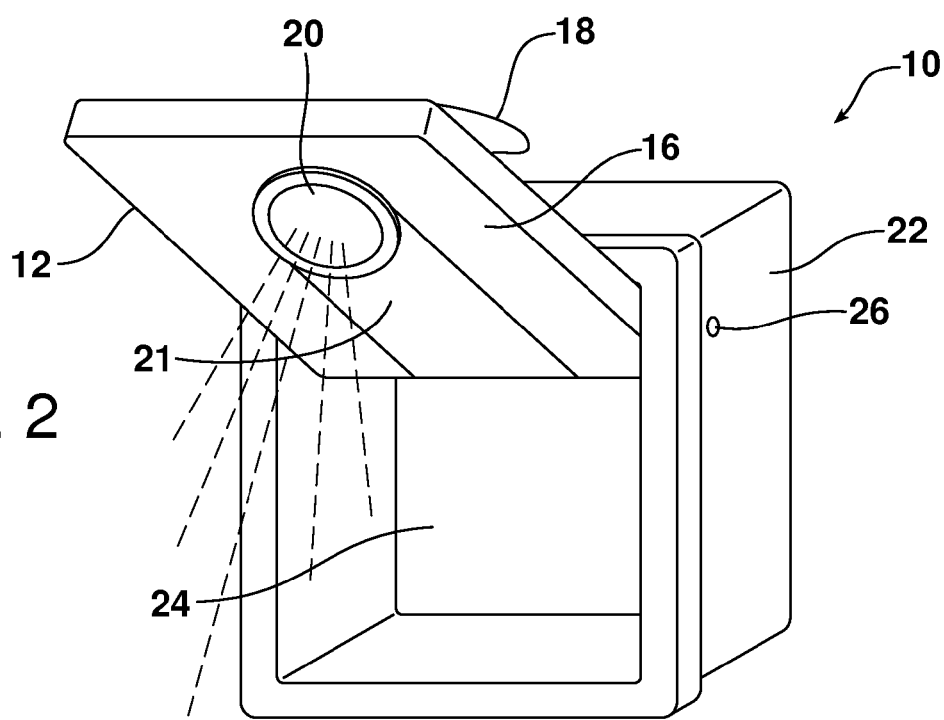
FIG. 2 is a perspective view similar to FIG. 1 but showing the base in the open position with the light source exposed and directed away from the cavity in the housing so as to be in a position to illuminate the interior of the vehicle.
Figure 2A:
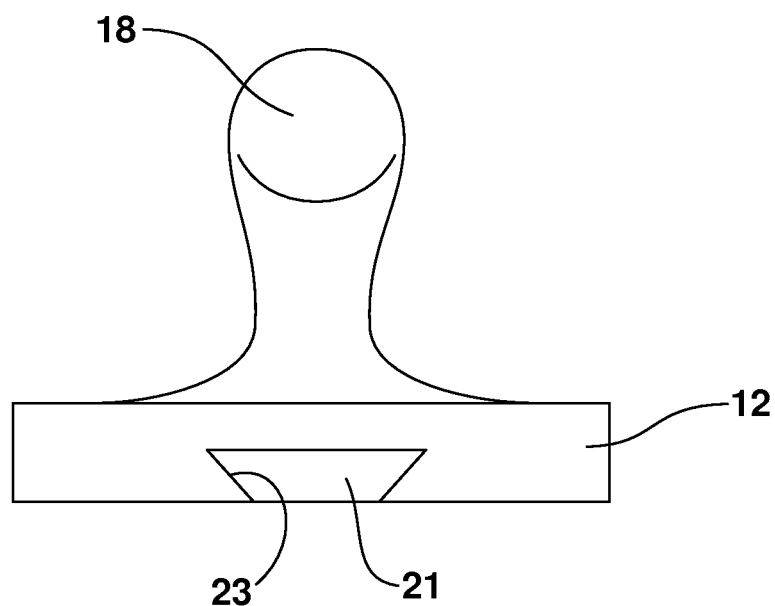
FIG. 2a illustrates the dovetail groove for mounting the optical grade face piece into the base.

Reference is now made to FIGS. 1-4 illustrating a first embodiment of the integrated coat hook and light source assembly 10. That assembly 10 may be broadly described as including a base 12 having a first face 14 and a second face 16. The two faces 14, 16 are opposing in the illustrated embodiment. A coat hook 18 is carried on the first face 14. A light source 20 is carried on the second face 16. In the illustrated embodiment, the light source 20 is covered by an optical grade acrylic injection molded face piece 21 that slides into a dovetail groove 23 formed in the base 12 (see also FIG. 2a).

As further illustrated, the assembly 10 includes a housing 22 having a recess or cavity 24. The base 12 is pivotally mounted to the housing 22 by opposed hinge pins 26. When in the closed position, illustrated in FIG. 1, the base 12 covers the cavity opening closing the cavity 24. In this position, the coat hook 18 is exposed to the interior of the vehicle and may be utilized to hang a coat or other article. In this position, the light source 20 is oriented toward the cavity 24 and hidden from view within the housing 22.

In contrast, when the base 12 is pivoted to open the cavity 24, the light source 20 is directed away from the cavity into the interior of the vehicle so that it may provide illumination for the benefit of the user. Here it should be appreciated that the coat hook 18 functions as a convenient point for the user to grasp and open and close the base 12 as desired.

As should be appreciated from viewing FIG. 4, a first contact 30 is carried on a first of the hinge pins 26 while a second electrical contact 32 is carried on a second of the hinge pins. Electrical power is provided to the light source 20 through these two contacts 30, 32 and two cooperating contacts 31, 33 provided in the hinge receiving apertures 35 in the housing 22. The contacts 30, 31, 32, 33 may be shaped so as to provide electrical power to the light source 20 whenever the base is opened to expose the light source. Power, however, is interrupted to the light source 20 whenever the base is moved to the closed position illustrated in FIG. 1 with the light source directed inwardly into the cavity 24. More specifically, when the base 12 is rotated into the closed position illustrated in FIG. 1, gaps between the contacts 30, 32 and the contacts 31, 33 interrupt the power supply to the light source 20.

Reference is now made to FIGS. 5 and 6 illustrating an alternative embodiment of integrated coat hook and light source assembly 40. As illustrated, this embodiment of the assembly 40 includes a housing 42 that receives and holds a bezel 44 mounted for rotation in and relative to the housing. The base 46 is pivotally connected to the bezel 44 by means of the hinge 48. As with the earlier embodiment, the base 46 includes a first face 50 that carries the coat hook 52 and a second face 54 that carries the light source 56.

As illustrated in FIG. 5, when the base 46 is in a first position, the housing 42 is closed with the coat hook 52 exposed for use and the light source 56 hidden from view in the cavity 58. In contrast, as illustrated in FIG. 6, when the base 46 is in the second position, the housing 42 is open and the light source 56 is exposed and directed away from the cavity 58 in the housing so that it may illuminate the interior of the vehicle. Here, once again, it should be appreciated that the coat hook 52 acts as a convenient point for the user to grasp and manipulate the base 46. More specifically, in this embodiment not only may the coat hook 52 be utilized to open the base 46 by pivoting on the hinge 48, but it may also be utilized to rotate the bezel 44 in the housing 42. Thus, this second embodiment of the assembly 40 provides two degrees of freedom which allow the user to direct the light source 56 in an efficient and effective manner upon any number of different targets within the interior of the vehicle. More specifically, it should be appreciated that the bezel 44 rotates in the base 46 about a first axis $A_1$ (extending into and out of drawing FIG. 6) while the base 46 pivots on the hinge 48 about a second axis $A_2$ where the first axis is perpendicular to and offset from the second axis. As a result, directional lighting of the motor vehicle interior is provided both across the vehicle in the y direction, fore/aft in the x direction and up/down in the Z direction.

In the second embodiment, wiring for powering the light source 56 may be routed through the hinge 48 or provided by other means if desired.

In summary, the various embodiments of the integrated coat hook and light source assembly 10, 40 provide a number of substantial benefits. Either assembly 10, 40 provides an uncluttered and aesthetically pleasing appearance that enhances the look and appeal of the headliner. When open, either of the assemblies 10, 40 provides a light source 20, 56 that may be directed as desired onto various target areas within the interior of the vehicle.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An integrated coat hook and light source assembly for a motor vehicle having a headliner, comprising:
    a housing mounted to the headliner;
    a bezel mounted for rotation relative to said housing;
    a base pivotally connected to said bezel;
    a coat hook carried on said base; and
    a light source carried on said base.

2. The integrated coat hook and light source assembly of claim 1, wherein said base has a first face and a second face.

3. The integrated coat hook and light source assembly of claim 2, wherein said coat hook is carried on said first face and said light source is carried on said second face.

4. The integrated coat hook and light source assembly of claim 3, wherein said housing includes a cavity having an opening closed by said base.

5. The integrated coat hook and light source assembly of claim 4, wherein said base is pivotally displaceable between a first position wherein said cavity is closed and said light source is hidden in said cavity and a second position wherein said cavity is open and said light source is directed away from said cavity.

6. The integrated coat hook and light source assembly of claim 5, wherein said base is pivotally connected to said bezel by a hinge.

7. The integrated coat hook and light source assembly of claim 1, wherein said bezel rotates about a first axis $A_1$ and said base pivots about a second axis $A_2$ where said first axis $A_1$ is perpendicular to and offset from said second axis $A_2$.

8. The integrated coat hook and light source assembly of claim 7, wherein said base has a first face and a second face.

9. The integrated coat hook and light source assembly of claim 8, wherein said coat hook is carried on said first face and said light source is carried on said second face.

10. The integrated coat hook and light source assembly of claim 9, wherein said housing includes a cavity having an opening closed by said base.

11. The integrated coat hook and light source assembly of claim 10, wherein said base is pivotally displaceable between a first position wherein said cavity is closed and said light source is hidden in said cavity and a second position wherein said cavity is open and said light source is directed away from said cavity.

12. An integrated coat hook and light source assembly for a motor vehicle having a headliner, comprising:
    a housing mounted to the headliner;
    a base pivotally connected to said housing by first and second opposed hinge pins, said base having a first face and a second face, and wherein said housing includes a cavity having an opening closed by said base;
    a coat hook carried on said first face of said base; and
    a light source carried on said second face of said base, wherein said base is pivotally displaceable between a first position wherein said cavity is closed and said light source is hidden in said cavity and a second position wherein said cavity is open and said light source is directed away from said cavity, and wherein said first hinge pin carries a first electrical contact and said second hinge pin carries a second electrical contact to provide power to said light source.

* * * * *